United States Patent [19]

Traeger et al.

[11] Patent Number: 4,823,684
[45] Date of Patent: Apr. 25, 1989

[54] PELLET-FIRED BARBECUE

[76] Inventors: Joseph P. Traeger, 250 S. Oak St.;
Randolph J. Traeger, 530 Alder St.;
Mark A. Traeger, 540 Leo St., all of
Mt. Angel, Oreg. 97362

[21] Appl. No.: 110,457

[22] Filed: Oct. 19, 1987

[51] Int. Cl.⁴ .............................................. A47J 37/07
[52] U.S. Cl. ...................................... 99/447; 99/450;
99/476; 99/482
[58] Field of Search ............... 399/481, 482, 449, 444,
399/422, 426, 447, 450, 476; 126/271.3, 13, 242,
243, 245, 10, 11, 39 K

[56] References Cited

U.S. PATENT DOCUMENTS

| | | | |
|---|---|---|---|
| 652,531 | 6/1900 | Carlson | 99/482 |
| 1,779,453 | 10/1930 | Taylor | 99/482 |
| 2,444,985 | 7/1948 | Fulton | 126/242 |
| 3,279,452 | 10/1966 | Holtenroth et al. | 99/447 |
| 3,474,725 | 10/1969 | McClaren | 99/447 |
| 3,683,791 | 8/1972 | Rast, Jr. | 99/447 |
| 3,809,056 | 5/1974 | Snelling | 99/482 |
| 3,882,767 | 5/1975 | Oyler et al. | 99/447 |
| 3,982,522 | 9/1976 | Hottenroth et al. | 99/447 |
| 4,362,093 | 12/1982 | Griscon | 99/447 |
| 4,495,860 | 1/1985 | Hitch et al. | 99/482 |
| 4,572,062 | 2/1986 | Widdowson | 99/447 |
| 4,700,618 | 10/1987 | Cox, Jr. | 99/481 |
| 4,721,037 | 1/1988 | Blosnick | 99/481 |

Primary Examiner—Harvey C. Hornsby
Assistant Examiner—Joseph S. Machuga
Attorney, Agent, or Firm—Kolisch, Hartwell & Dickinson

[57] ABSTRACT

A pellet-fired barbecue including an elevated barbecue pan fired by a pellet-burning pot mounted below the bottom of the barbecue. A heat baffle plate is disposed within the pan above the top of the pot, and forced-air mechanism produces movement of hearted air within the barbecue.

5 Claims, 2 Drawing Sheets

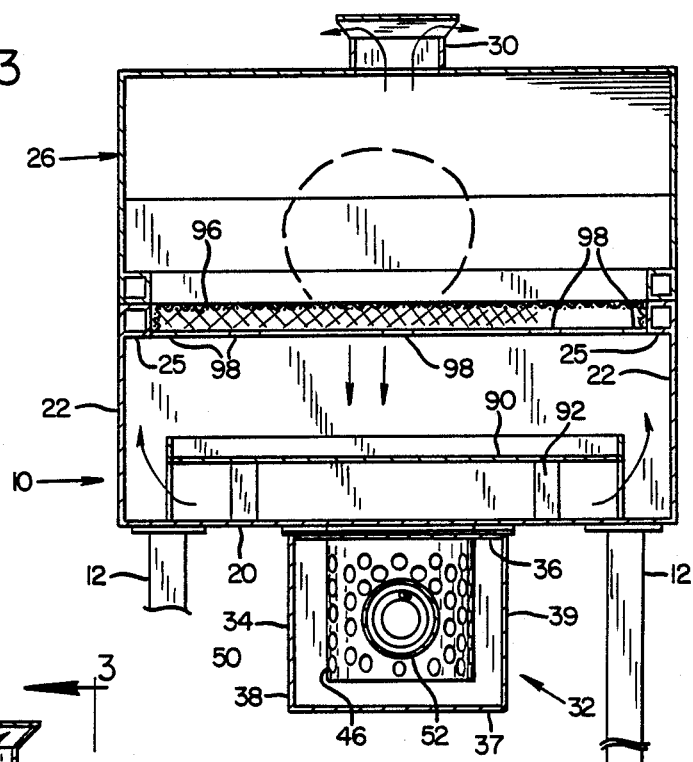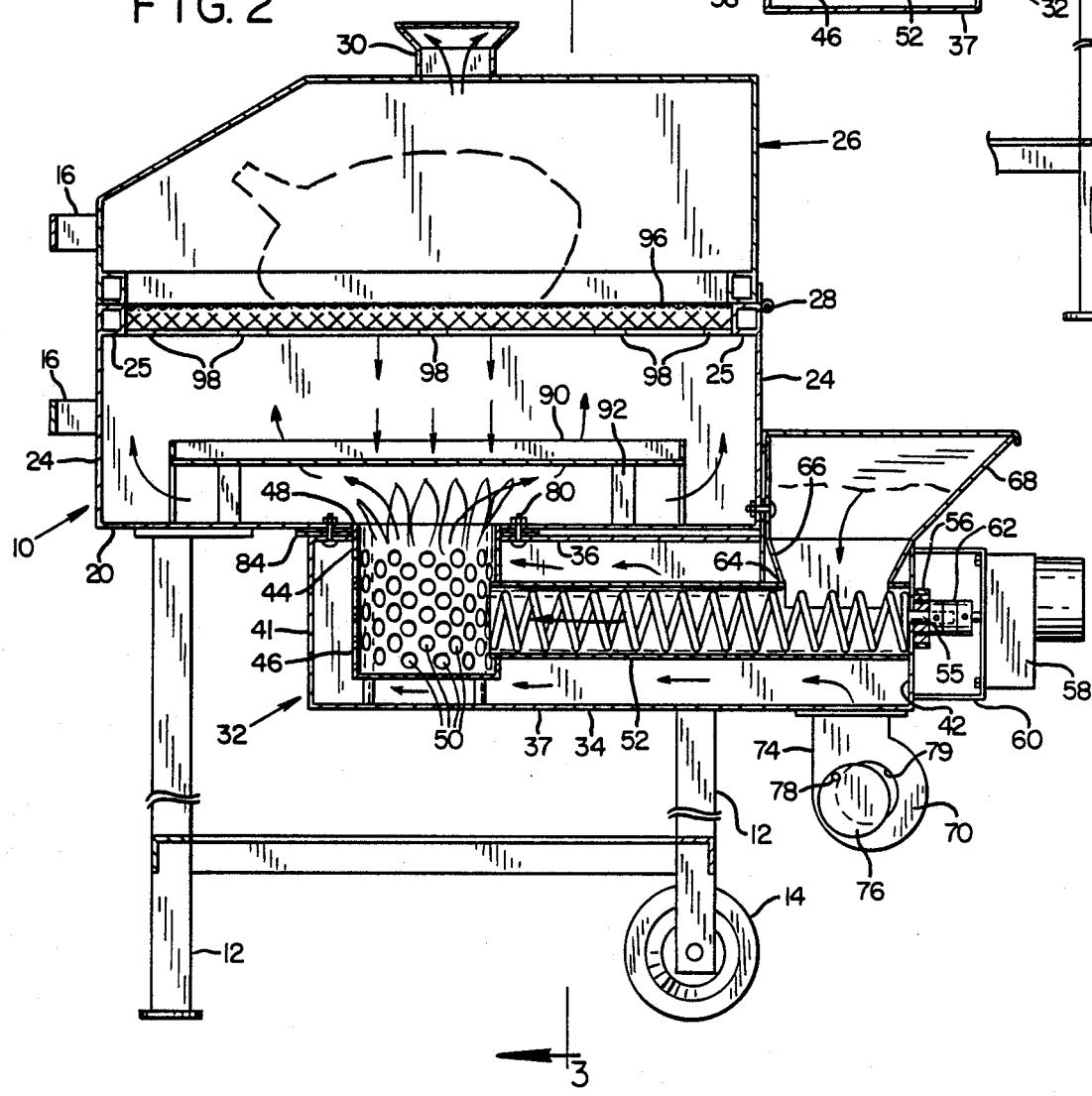

PELLET-FIRED BARBECUE

BACKGROUND AND SUMMARY OF THE INVENTION

This invention relates to barbecue apparatus, hereinafter for brevity's sake being referred to simply as barbecues, which include a source of heat and which are usable, usually in an outdoor setting, to prepare foods as by broiling or baking them.

Most barbecues, as currently known, utilize so-called charcoal briquets or, in some instances, gas burners as the source of heat. Briquets are expensive, require time to become properly ignited and reach operating temperatures, tend to be messy to handle, and when cooking is finished, are difficult to extinguish. As a consequence, they are usually left to burn themselves out, resulting in wastage of the briquet fuel. While gas burners have certain convenience features not shared by briquets, they do not impart a flavor to the cooked material because of the lack of smoke which characterizes a wood-based fire.

Wood-based pellets are known which have been used to some extent in the past for household heating purposes. Such pellets are conventionally prepared by pelletizing under heat and pressure comminuted wood waste or other residues to produce a pellet product of substantially uniform size. Typical pellets might have diameters within the range of one-quarter to one-half inch and lengths of one-half to one inch and, depending to some extent upon their source, may have considerable heat content for a given mass of material.

A general object of this invention is to provide a novel barbecue which utilizes as a heat source therein a pellet-fired burner evolving heat adjacent the base of a barbecue pan.

Another object is to provide such a barbecue where the burner in the barbecue includes forced-air means contributing combustion-supporting air for the burning of the pellets, and which further produces a form of convection heating for the food being cooked. Hot forced air circulates in the barbecue pan as a result of the forced-air means, resulting in more even cooking, and greater flexibility in the cooking use of the barbecue.

Yet another object is to provide such a barbecue where the fire pot of a burner, where burning of fuel occurs, opens to the interior of the barbecue pan at the bottom of the barbecue pan. An auger feed mechanism for supplying pellet material for burning extends under the barbecue pan in a more-or-less heat-isolated position. Combustion supporting air may be forced through a suitable housing in the apparatus to be expelled first into the fire pot of the burner and, thence, upwardly in circulated flow through the interior of the barbecue pan.

In a specific and preferred embodiment of the invention, a metallic baffle plate is mounted within the interior of the barbecue pan in covering relation over and spaced upwardly from the top of the pot in the burner. This baffle pan serves a number of important functions, including promoting proper circulation in the barbecue pan, providing a means which is heated and serves as a radiant heat source for food cooked in the barbecue, and further providing a means extending under the food to be cooked for collecting drippings and such and preventing such from falling to the base of the pan proper. The baffle plate is easily removed when necessary for cleaning purposes.

With the barbecue contemplated, a number of advantages result. Fire startup is relatively rapid, and far less time-consuming then the starting of a briquet fire. The fuel used is considerably less expensive than briquets. Furthermore, the amount of fuel used is only that necessary to produce the cooking, since with termination of the feed of pellet material, the burner extinguishes itself relatively rapidly. Unlike gas-fired barbecues, the material cooked is subjected to a flavorful wood smoke to retain some of the taste thereof. With the advantage indicated of convection heating in the barbecue, cooking times are increased and the types of products cooked and manner of cooking are subject to greater variation.

These and other objects and advantages are attained by the invention, which is described hereinbelow in conjunction with the accompanying drawing, wherein:

FIG. 2 is a side elevation, also with portions broken away, of the barbecue shown in FIG. 1; and FIG. 3 is a cross-sectional view, taken generally along the line 3—3 in FIG. 2.

Figure 1:
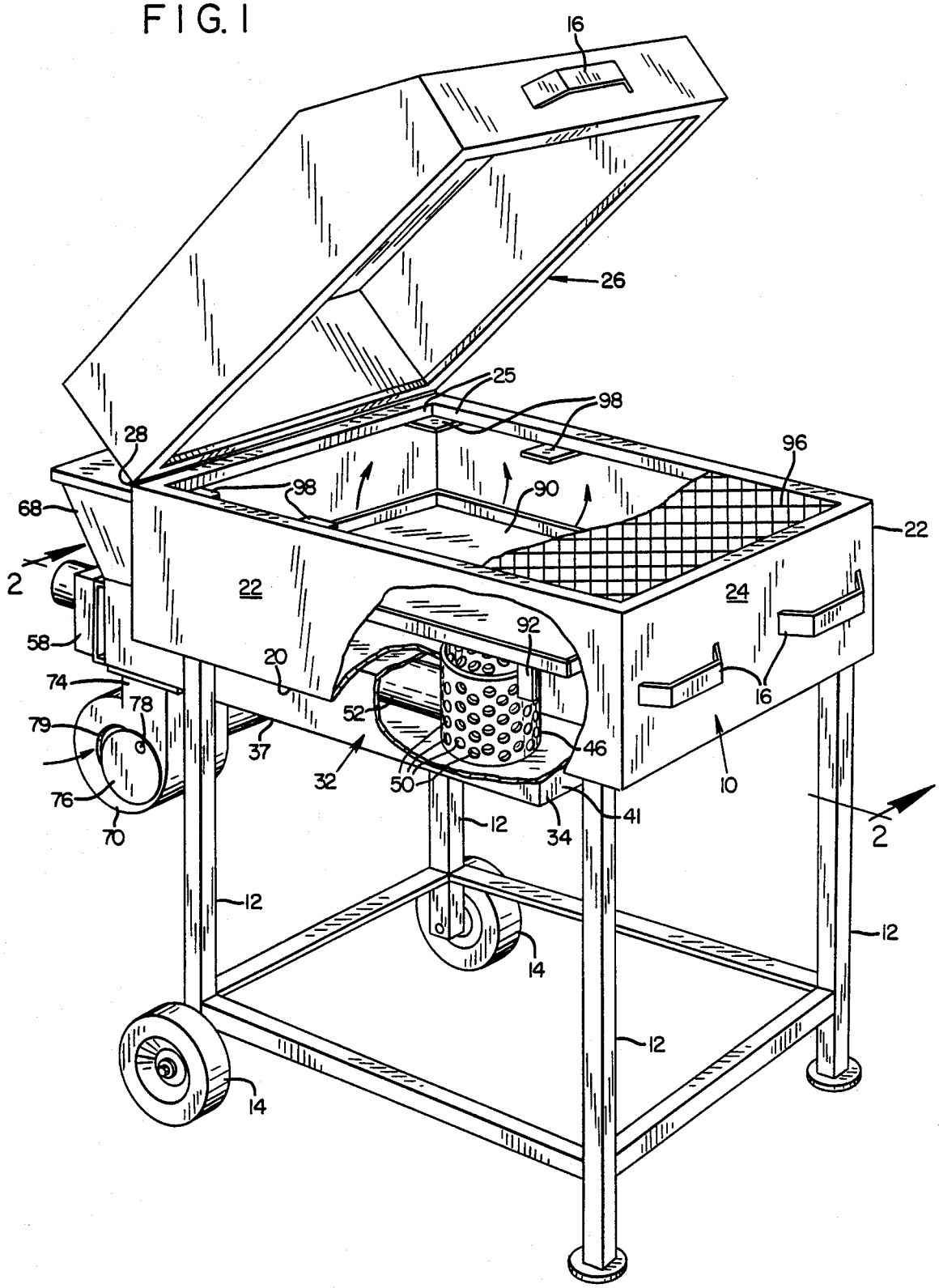
FIG. 1 is a perspective view of a barbecue as contemplated with portions broken away.

Referring now to the drawings, the barbecue illustrated comprises what is referred to as a barbecue pan, shown generally at 10. Such is supported in an elevated position above the ground, to place the top of the pan at a convenient working height, through legs 12 secured to and extending downwardly from the base of the pan. For convenience of moving, if desired, wheels 14 are provided rotatably journaled on the base of two of the legs in the barbecue. For moving purposes, the barbecue may be partially raised utilizing handles 16 connected to the pan whereby ground contact is solely through those legs having wheels 14, the barbecue then being rollable to the position desired.

Pan 10 includes a bottom 20 and opposed side and end walls 22, 24 joined to bottom 20. The top of the pan may be reinforced as by framing 25. Pan 10 is open at the top. If desired, a hinged cover 26 may be included connected by hinges 28 to pan 10. The cover is swingable between a closed position where the cover closes off the top of the barbecue pan, as shown in FIG. 2, and an open position where the cover is swung to one side to expose the barbecue pan interior, as shown in FIG. 1. The cover may further include a ventilating hood as shown at 30.

Shown at 32 is a burner assembly which extends underneath the barbecue pan from approximately centrally of the pan to a position on one side thereof.

In the specific embodiment of the invention disclosed, the burner assembly includes an elongate housing 34 of substantially rectangular, i.e., square, cross section, and including top, bottom, and opposed side walls indicated at 36, 37, 38, and 39. The ends of the housing are closed off by end walls 41, 42.

Top wall 36 has a circular aperture 44 adjacent one end. Suitably secured as by welding within the housing and communicating with this aperture is a cylindrical fire pot 46 which is open at its top and closed at its bottom. The interior of the fire pot faces upwardly, and communicates with the interior of pan 10 through aperture 48 in bottom 20 of the pan. The cylindrical wall of the fire pot contains perforations 50.

With the construction described, the housing walls define a chamber extending along the interior of the housing and this chamber communicates through perforations 50 with the interior of the fire pot.

Extending along the interior of housing 34 is a tube 52 having one end secured as by welding to the cylindrical wall of pot 46. The wall of the pot is cut out to provide an opening therein which communicates with the interior of tube 52. The opposite end of the tube is appropriately secured to end wall 42 of the housing.

Mounted within tube 52 is an elongate auger 54 terminating in a shaft 55. The shaft extends through wall 42 where it is supported in a bearing assembly 56. An electric gear motor 58 mounted on the end of the housing through bracket 60 has its output shaft connected through drive coupling 62 with the end of auger shaft 55.

Tube 52 is open at 64 and a wall 66 extending up from this opening provides a throat for the channelling of pellet fuel downwardly onto the auger to be fed thence by operation of the auger through the auger tube. A hopper 68 is supported on top of housing 34 which holds a supply of pellet fuel. The top wall of the housing is suitably cut away to place the base of the hopper in direct communication with the top of the throat defined by wall 66.

Supported on the underside of housing 34 approximately underneath the hopper is an electrically operated blower 70 having its discharge end connected through duct 74 with the chamber defined along the length of the interior of housing 34. A shutter 76 supported on the blower assembly by a pivot mounting 78 is adjustable to vary the degree of closure of intake 79 to the blower and, in this way, the amount of air flow produced by the blower through its discharge opening along the length of the housing.

The housing is supported on the underside of the pan through bolts 80 which extend upwardly from top wall 36 and through accommodating bores provided in the bottom of the pan, with securement completed using nuts screwed onto the protruding ends of the bolts. Gasket material 84 may be provided intermediate the top wall of the housing and the underside of the barbecue pan. Additional securement of the housing beneath the barbecue pan may be provided by securing a portion of the hopper to the side of the pan in an appropriate manner.

Disposed within the interior of the barbecue pan somewhat upwardly from the top of the fire pot is a nonperforate, metallic, baffle pan or plate shown at 90 including a floor and a raised shoulder extending about its perimeter. The baffle plate extends in a region disposed over the top of the fire pot and outwardly from this region to edges disposed inwardly somewhat from the side walls of the barbecue pan. The baffle plate is removably supported in this position as by legs 92 which may be joined either to the underside of the baffle pan or to the base of the barbecue pan with their opposite extremities unsecured.

A food-support means or grill 96 is mounted within the interior of the barbecue pan and directly adjacent the top thereof, such grill being supported on support lugs 98 joined to the side walls of the barbecue pan.

To start up the barbecue, the grill is removed and the baffle pan tipped to an upright position which exposes the top of the fire pot. A small amount of wood pellets, i.e., a handful, are then placed in the fire pot together with combustible material such as paper, and the like. This is then lit, and combustion allowed to proceed for a short period of time such as two minutes or so. The baffle pan and grill may then be replaced in their operative positions, the air blower started, and the auger motor started. This produces forced-air circulation down the interior of housing 34 with the air blowing inwardly into the fire pot to support combustion of the material therein. The operation of the auger produces a gradual feed of replacement pellets to the fire pot, replacing material as such is burned. Normally a warmup period of only a few minutes is required after replacement of the grill and before cooking may proceed.

With the barbecue operating, food to be cooked may be placed on the grill. The blower produces forced-air circulation within the interior of the barbecue pan with heated air coming from the fire pot moving upwardly and around the baffle plate and thence circulating against and through the grill. Cooking may be performed with the cover in the closed position or with the cover open. With the cover closed, oven-like conditions are produced within the barbecue, and with the cover open, grill-like conditions are produced. The baffle plate on being heated radiates heat upwardly. Drippings from any food cooked are prevented from falling into the fire pot by the baffle plate which collects such material.

With cooking concluded, the auger is stopped which stops feed of pellet material to the fire pot. With stoppage of pellet feed and with the blower turned off, combustion in the pot soon terminates.

It should be clear from the above that a novel barbecue has been described which is efficient in operation, highly versatile in the type of cooking that it accommodates, provides for forced-circulation of heated air, and provides for radiant heating with the baffle plate as disclosed above the burner pot. The wood pellet fuel utilized is available at substantially lower costs than charcoal briquets. With burning of the fuel, a wood-smoke taste results not produced with gas-fired barbecues.

While an embodiment of the invention has been described, it should be obvious that modifications and variations are possible without departing from the invention.

It is claimed and desired to secure by Letters Patent:

1. A pellet-fired barbecue comprising:
   a pan with bottom and sides and open at the top,
   a fire pot having sides and an open top mounted adjacent the bottom of the pan with the sides of the pot joining with the bottom of the pan and with the open top of the fire pot communicating with the interior of the pan,
   auger means for supplying pellet fuel to the fire pot, said auger means comprising an auger tube mounted beneath said pan with an end of the tube connected with a side of said pot and a rotatable auger disposed within said auger tube,
   food-support means for supporting food to be cooked disposed above the fire pot and adjacent the top of said pan and,
   means for admitting air into the fire pot to support combustion comprising perforations in the sides of the pot spaced from where said tube is connected with a side of said pot, said air being channeled by said pot upwardly into the interior of said pan.

2. The barbecue of claim 1, wherein the food-support means comprises a grill, and which further includes a metallic baffle plate disposed within the pan interior intermediate the top of said pot and said grill.

3. The barbecue of claim 1, where the means for admitting air further comprises means encompassing said fire pot defining a chamber communicating with said perforations, and an air blower means with its discharge connected with said chamber.

4. A pellet-fired barbecue comprising:
  a pan with bottom and sides and an open top and means supporting said pan above the ground,
  a substantially horizontal metallic heat baffle plate disposed within the interior of the pan upwardly from said bottom,
  a substantially horizontal grill disposed within the interior of said pan adjacent the top thereof and spaced above said baffle plate,
  a fire pot having sides and an open top mounted adjacent the bottom of said pan with the sides of the pot joining with the bottom of said pan and with the open top of said pot communicating with the interior of the pan beneath said baffle plate,
  auger means for supplying pellet fuel to the fire pot, and
  forced air means connecting with the inside of said pot to produce heated air flow upwardly from said pot and against said baffle plate.

5. The barbecue of claim 4, wherein
  said auger means comprises an auger tube mounted beneath said pan connecting with a side of said pot and a power-driven auger disposed within said auger tube, and
  wherein said forced air means comprises perforations in the sides of said pot located beneath said pan bottom and spaced from where said auger tube connects with a side of said pot, means defining a chamber encompassing said pot and its said openings, and a blower with its discharge connecting to said chamber for forcing air into said chamber and through said pot perforations into the interior of the pot with such air being channelled by the pot upwardly to be expelled beneath said baffle plate.

* * * * *